(12) United States Patent
Peng

(10) Patent No.: US 10,097,676 B2
(45) Date of Patent: *Oct. 9, 2018

(54) PROTECTIVE MASK OF MOBILE PHONE

(75) Inventor: Kuan-Lin Peng, Taipai (TW)

(73) Assignee: Gregory Jukyoung Kim, Westmont, IL (US)

( * ) Notice: Subject to any disclaimer, the term of this patent is extended or adjusted under 35 U.S.C. 154(b) by 119 days.

This patent is subject to a terminal disclaimer.

(21) Appl. No.: 13/094,428

(22) Filed: Apr. 26, 2011

(65) Prior Publication Data

US 2011/0201394 A1 Aug. 18, 2011

Related U.S. Application Data

(63) Continuation of application No. 11/673,237, filed on Feb. 9, 2007, now Pat. No. 7,941,195, which is a continuation of application No. 09/888,488, filed on Jun. 26, 2001, now Pat. No. 7,194,291.

(30) Foreign Application Priority Data

Nov. 17, 2000 (CN) ..................................... 252902

(51) Int. Cl.
 *H04M 1/02* (2006.01)
 *H04B 1/3888* (2015.01)

(52) U.S. Cl.
 CPC ........ *H04M 1/0283* (2013.01); *H04B 1/3888* (2013.01); *H04M 1/0214* (2013.01)

(58) Field of Classification Search
 CPC . H04W 88/02; H04M 1/0283; H04M 1/0214; H04M 1/0202; H04M 1/0212; H04M 1/0216; H04B 1/3888

USPC .... 455/90.1, 90.3, 348, 349, 433.01, 433.11, 455/451, 550, 550.1, 575.1
See application file for complete search history.

(56) References Cited

U.S. PATENT DOCUMENTS

| | | |
|---|---|---|
| D211,355 S | 6/1968 | Farnham et al. |
| D219,451 S | 12/1970 | Blackman |
| 4,121,061 A | 10/1978 | Donaldson |
| 5,012,513 A | 4/1991 | Dale et al. |
| D337,435 S | 7/1993 | Kaneko et al. |

(Continued)

FOREIGN PATENT DOCUMENTS

| | | |
|---|---|---|
| CN | 00252902.5 | 11/2000 |
| DE | 20019958 U1 | 2/2001 |
| DE | 20111112 U1 | 9/2001 |

OTHER PUBLICATIONS

IL Telefono Cellulare & C. 2 pages. Date: Oct. 2000. (Shows replacement mobile telephone housing portions.).

*Primary Examiner* — Dinh Nguyen
(74) *Attorney, Agent, or Firm* — Invention Mine LLC

(57) ABSTRACT

The present invention relates to a protective mask of mobile phone comprising an upper cover body and a lower cover body. The upper and lower cover bodies can be joined with a front and a rear phone housing of a mobile phone, respectively, to effectively prevent abrasion of the mobile phone due to carelessness of a user, thereby preventing ill-favored scars on the mobile phone. Therefore, the deterioration of the quality of the mobile phone and the fall of its value can be avoided. Moreover, trend and fashion of the mobile phone can be achieved without the need of replacing the mobile phone. Therefore, waste of money can be avoided, and economic burden to the user can be lessened.

12 Claims, 7 Drawing Sheets

(56) References Cited

U.S. PATENT DOCUMENTS

| | | | |
|---|---|---|---|
| D338,470 | S | 8/1993 | Clayton |
| D342,262 | S | 12/1993 | Hester |
| D348,472 | S | 7/1994 | Cyfko |
| 5,383,091 | A | 1/1995 | Snell |
| D365,927 | S | 1/1996 | Cho |
| D369,903 | S | 5/1996 | Tetrault |
| 5,586,704 | A | 12/1996 | Alexander et al. |
| D382,538 | S | 8/1997 | Brunette |
| D385,283 | S | 10/1997 | Snyder et al. |
| D385,554 | S | 10/1997 | Nuovo et al. |
| 5,678,204 | A | 10/1997 | Naylor |
| D395,749 | S | 7/1998 | Jayez |
| D396,951 | S | 8/1998 | Huber |
| D397,246 | S | 8/1998 | Hoofnagle et al. |
| 5,809,403 | A | 9/1998 | MacDonald, Jr. et al. |
| D400,541 | S | 11/1998 | Harrison |
| D408,402 | S | 4/1999 | Shimelfarb et al. |
| 5,896,277 | A | 4/1999 | Leon et al. |
| 5,923,752 | A * | 7/1999 | McBride et al. ........ 379/433.11 |
| 5,933,330 | A | 8/1999 | Beutler et al. |
| 5,988,577 | A | 11/1999 | Phillips et al. |
| 6,006,074 | A | 12/1999 | De Larminat et al. |
| 6,011,699 | A | 1/2000 | Murray et al. |
| D425,907 | S | 5/2000 | Frye et al. |
| 6,073,027 | A | 6/2000 | Norman et al. |
| 6,073,034 | A | 6/2000 | Jacobsen et al. |
| 6,075,977 | A | 6/2000 | Bayrami |
| 6,082,535 | A | 7/2000 | Mitchell |
| 6,128,515 | A * | 10/2000 | Kabler ................. H04B 1/3805 455/556.2 |
| 6,130,945 | A | 10/2000 | Shin |
| 6,157,545 | A | 12/2000 | Janninck et al. |
| 6,184,835 | B1 | 2/2001 | Chen et al. |
| 6,201,867 | B1 | 3/2001 | Koike |
| 6,224,225 | B1 | 5/2001 | Chen |
| D448,368 | S * | 9/2001 | Bettag ......................... D14/250 |
| 6,430,400 | B1 | 8/2002 | MacDonald, Jr. et al. |
| 6,563,927 | B2 | 5/2003 | Mote et al. |
| 6,591,088 | B1 | 7/2003 | Watanabe |
| 6,594,472 | B1 | 7/2003 | Curtis et al. |
| 6,842,633 | B1 | 1/2005 | Deo et al. |
| 6,876,837 | B2 | 4/2005 | Kuroshima et al. |
| 6,898,283 | B2 | 5/2005 | Wycherley et al. |
| 7,069,063 | B2 | 6/2006 | Halkosaari et al. |
| 7,194,291 | B2 | 3/2007 | Peng |
| 7,941,195 | B2 | 5/2011 | Peng |

\* cited by examiner

PROTECTIVE MASK OF MOBILE PHONE

RELATED APPLICATIONS

This application is a continuation of U.S. patent application Ser. No. 11/673,237, filed Feb. 9, 2007, now U.S. Pat. No. 7,941,195, which (i) is a continuation application of U.S. patent application Ser. No. 09/888,488, filed Jun. 26, 2001, now U.S. Pat. No. 7,194,291, and (ii) claims priority to Chinese Patent Application No. CN00252902.5, filed Nov. 17, 2000, the contents of which are incorporated herein by reference.

FIELD OF THE INVENTION

The present invention relates to a protective mask of mobile phone and, more particularly, to an assembly structure used in a mobile phone.

BACKGROUND OF THE INVENTION

FIGS. 1 and 2 show the structure of a prior art mobile phone. The outer look of the structure is approximately a rectangular parallelepiped comprising a front phone housing and a rear phone housing. One end of the front phone housing 11 is pivotally joined with one end of the rear phone housing 12, as shown in FIG. 2. An antenna 121 is disposed on the rear phone housing 12. A mobile phone 10 is formed after assembling the front and rear phone housings 11 and 12. The mobile phone 10 can be used for receiving a call, dialing a telephone number, making a call, displaying messages, and setting functions.

However, because the front and rear phone housings 11 and 12 of the mobile phone 10 are very smooth and delicate, abrasion may easily arise due to carelessness of a user so as to generate ill-favored scars thereon, resulting in the deterioration of the quality of the mobile phone and the fall of its value.

Moreover, the design of the mobile phone 10 tends to be more and more diversified in consideration of trend and fashion. The user usually spends a lot of money to change the mobile phone 10 to adhere to the fashion, resulting in waste of money.

Accordingly, the above mobile phone structure has inconvenience and drawbacks in practical installation and use. The present invention aims to resolve the problems in the prior art.

SUMMARY OF THE INVENTION

The primary object of the present invention is to provide a protective mask of mobile phone to effectively prevent abrasion of a mobile phone due to carelessness of a user, thereby preventing ill-favored scars on the mobile phone. Therefore, the deterioration of the quality of the mobile phone and the fall of its value can be avoided.

The secondary object of the present invention is to provide a protective mask of mobile phone so that trend and fashion of a mobile phone can be achieved without the need of replacing the mobile phone. Therefore, waste of money can be avoided, and economic burden to the user can be lessened.

To achieve the above objects, the present invention provides a protective mask for a mobile phone comprising an upper cover body and a lower cover body. The upper and lower cover bodies are integrally formed by means of mold ejection of plastic. Patterns, types, or nameplates can be printed on the upper and lower cover bodies. The upper and lower cover bodies can sheathe a mobile phone therein. A gap, cavities, and slots corresponding to an antenna, an earphone cavity, an incoming-call informing light and so on of the mobile phone are disposed on the lower cover body so that a user can successfully receive a call and use various kinds of functions and settings of the mobile phone.

The various objects and advantages of the present invention will be more readily understood from the following detailed description when read in conjunction with the appended drawings, in which:

DETAILED DESCRIPTION OF PREFERRED EMBODIMENTS

As shown in FIGS. 3 to 6, the present invention relates to a protective mask of mobile phone and, more particularly, to an assembly structure used in a mobile phone. The protective mask of mobile phone of the present invention comprises an upper cover body 20 and a lower cover body 30.

Figure 1:
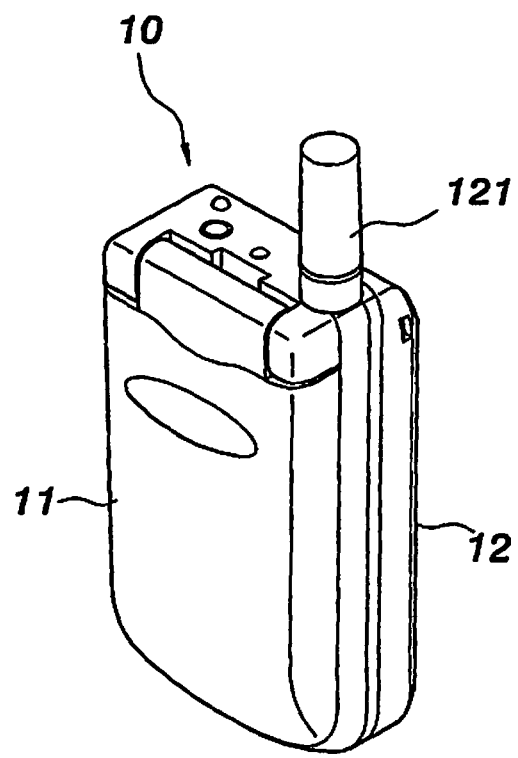
FIG. 1 is a perspective view of a prior art mobile phone.
Figure 2:
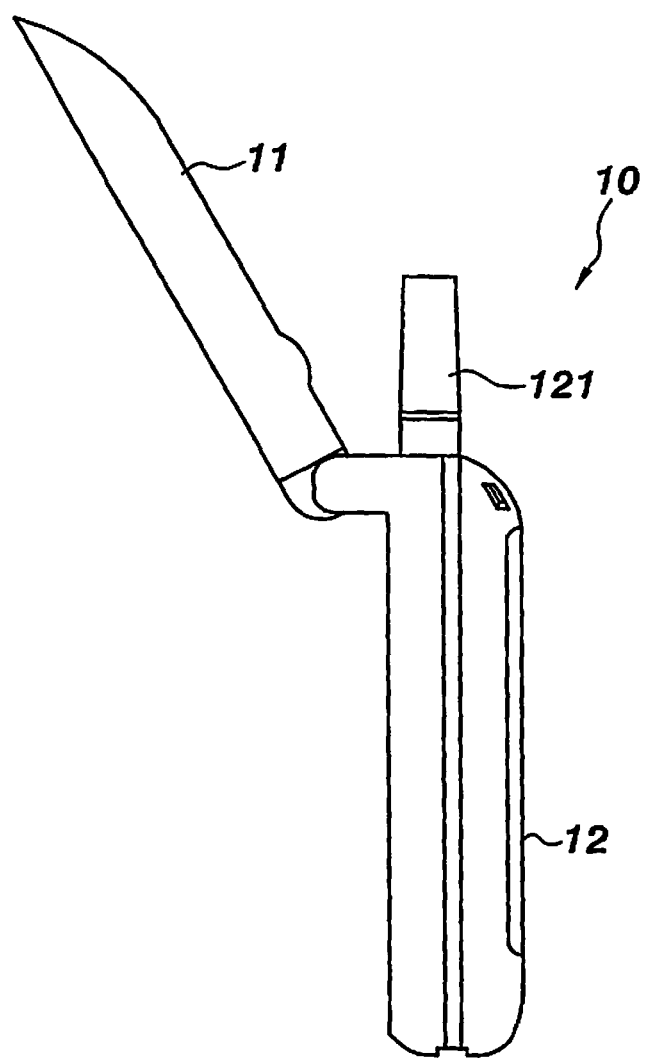
FIG. 2 is a diagram showing the use state of a prior art mobile phone.
Figure 3:
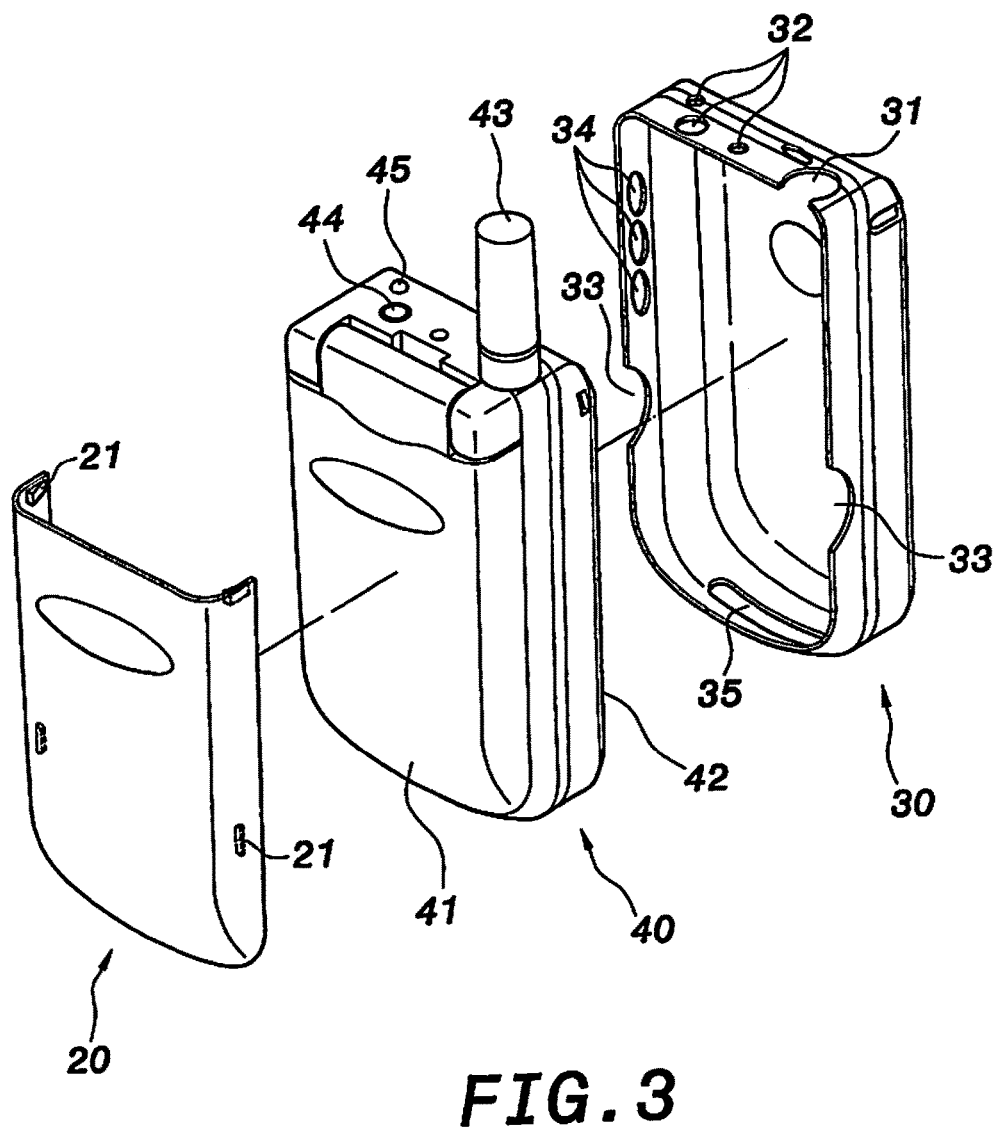
FIG. 3 is an exploded perspective view of the present invention and a mobile phone.
Figure 4:
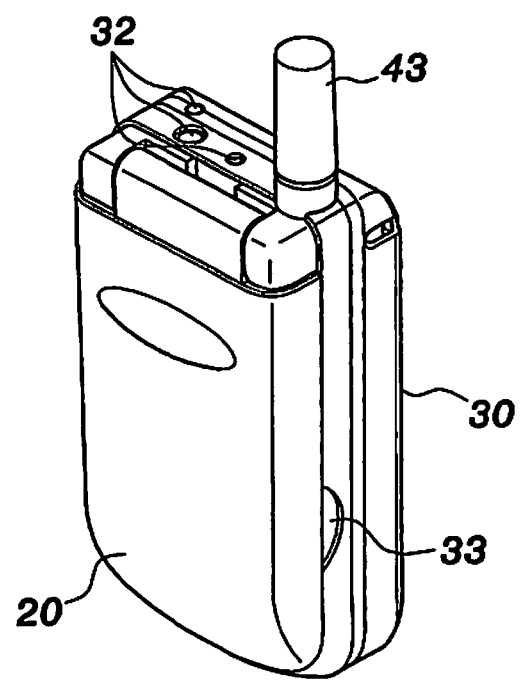
FIG. 4 is a perspective view of the present invention assembled with a mobile phone.
Figure 5:
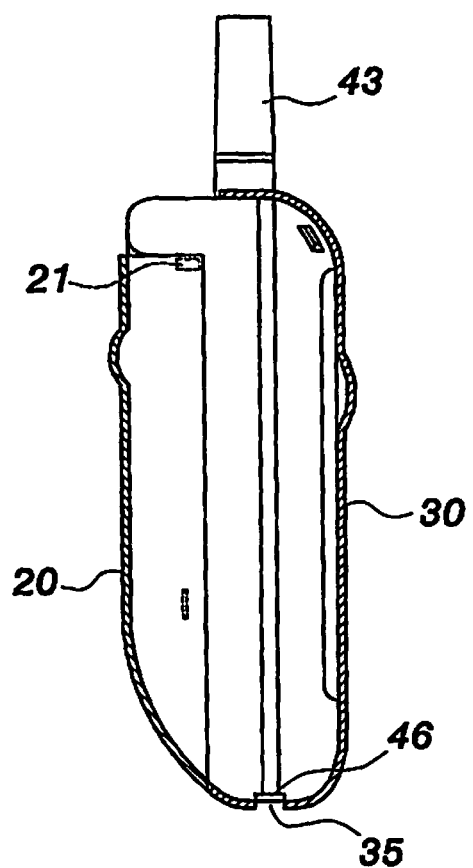
FIG. 5 is a cross-sectional view of the present invention assembled with a mobile phone.

The upper cover body 20 is integrally formed by mold injection of plastic. Patterns, types, or nameplates can be printed on a front side face of the upper cover body 20. The upper cover body 20 can be joined with a front phone housing 41 of a mobile phone 40, as shown in FIG. 4. A rear side face of the upper cover body 20 has a plurality of flanges 21, as shown in FIG. 3. The flanges 21 can be retained at the edge of the front phone housing 41 of the mobile phone 40. The front phone housing 41 of the mobile phone 40 can be sheathed in the upper cover body 20, as shown in FIG. 5.

The lower cover body 30 is integrally formed by mold injection of plastic. Patterns, types, or nameplates can be printed on the lower cover body 30. The lower cover body 30 can be joined with a rear phone housing 42 of the mobile phone 40, as shown in FIG. 4. The lower cover body 30 has a gap 31 to retain an antenna 43 of the mobile phone 40, as shown in FIG. 3. A plurality of cavities 32 are disposed beside the gap 31 of the lower cover body 30. The cavities 32 can correspond to an earphone cavity 44, an incoming-call informing light 45 and so on of the mobile phone 40 so that a user can conveniently use the functions of the mobile phone 40.

Figure 6:
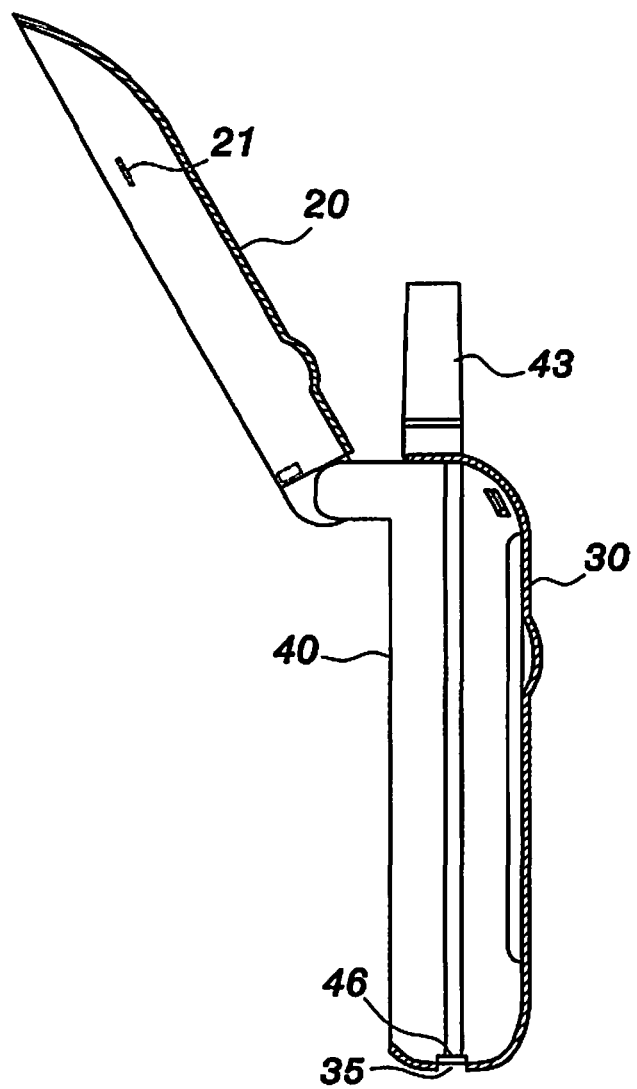
FIG. 6 is a diagram showing the use state of the present invention assembled 10 with a mobile phone.

Finger recessions 33 are respectively disposed at two sides of the lower cover body 30 so that a user can easily unfold the pivotally joined front phone housing 41 and rear phone housing 42 to receive a call or operate the mobile phone 40, as shown in FIG. 6. The finger recessions 33 can also let the user conveniently separate the mobile phone 40 and the lower cover body 30 for performing operations such as replacing a battery (not shown) of the mobile phone 40.

A plurality of holes 34 are disposed at one side of the lower cover body 30. The holes 34 can correspond to function keys (not shown) of the mobile phone 40 so that the user can successfully receive a call or set functions.

A bottom of the lower cover body 30 has a slot 35, which can correspond to a socket 46 (shown in FIG. 5) of the mobile phone 40 so that a user can plug in a power supply (not shown) of the mobile phone 40 to charge or recharge the mobile phone 40.

Figure 7:
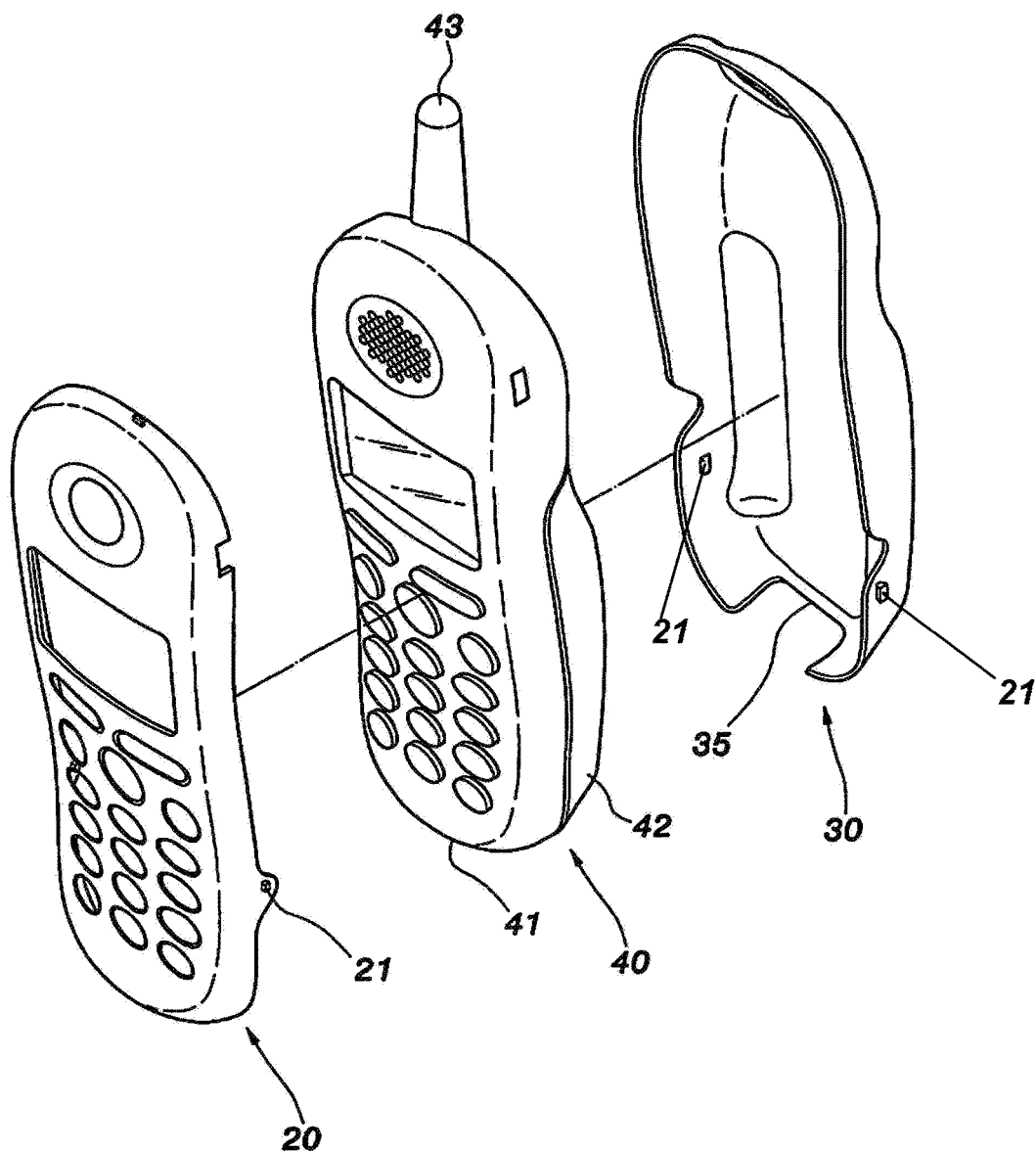
FIG. 7 is an exploded perspective view according to a second embodiment of the present invention.

As shown in FIG. 7, a different upper cover body 20 and a different lower cover body 30 are matched according to the outer look of a different mobile phone 40 so as to satisfy users having different mobile phones 40. The connection and disposition ways are the same as the above first embodiment of the present invention.

The present invention uses the upper cover body 20 and the lower cover body 30 to sheathe the mobile phone 40 therein so as to effectively prevent abrasion of the mobile phone 40 due to the carelessness of a user, thereby preventing ill-favored scars on the mobile phone. Moreover, trend and fashion of the mobile phone 40 can be achieved without the need of replacing the mobile phone 40.

Although the present invention has been described with reference to the preferred embodiments thereof, it will be understood that the invention is not limited to the details thereof. Various substitutions and modifications have been suggested in the foregoing description, and others will occur to those of ordinary skill in the art. Therefore, all such substitutions and modifications are intended to be embraced within the scope of the invention as defined in the appended claims.

The invention claimed is:

1. A protective mask molded for frictional retention to an exterior housing of a mobile phone having user input and output interfaces, and internal components including circuitry and a battery, wherein the exterior housing completely encloses the circuitry and the battery when the mobile phone is fully assembled and ready for use, the exterior housing having an exterior shape formed by a back surface, and at least portions of opposed side surfaces, the protective mask comprising:
   an integrally-formed mask body molded and contoured to conform and frictionally-fit tightly against the exterior shape of the exterior housing;
   an inner surface of the integrally-formed mask body defining an interior space of the integrally-formed mask body and conforming to and in substantially continuous surface-to-surface contact with the exterior shape of the exterior housing, with no substantial space between the inner surface of the integrally-formed mask body and the exterior shape of the exterior housing;
   at least one opening defined by the integrally-formed mask body permitting user access to at least the user input and output interfaces; and
   at least one retainer having an extension protruding laterally inward from the integrally-formed mask body and toward and into the integrally-formed mask body interior space, wherein the at least one retainer is retained to the exterior housing at an exterior housing edge when the mask is coupled to the mobile communication device, the at least one retainer participating in retaining the integrally-formed mask body to the mobile communication device.

2. The protective mask of claim 1, wherein the integrally-formed mask body further includes indicia selected from the group consisting of text, graphic elements and combinations thereof.

3. The protective mask of claim 1, wherein the integrally-formed mask body includes at least one feature opening to permit access to at least one feature of the mobile phone.

4. The protective mask of claim 1, wherein the integrally-formed mask body includes a socket opening corresponding to a socket of the mobile phone and permitting a user to plug a power supply into the socket to charge the mobile phone.

5. A protective mask molded for frictional retention to an exterior housing of, and adapted to be coupled to, a mobile communication device having internal components including circuitry and a battery, wherein the exterior housing completely encloses the circuitry and battery when the mobile communication device is fully assembled and ready for use, and wherein the exterior housing has an exterior shape including a back face and at least portions of opposed side surfaces, the protective mask comprising:
   an integrally-formed mask body molded and contoured to conform and frictionally fit to the exterior shape of the exterior housing;
   an inner surface of the integrally-formed mask body defining an interior space of the integrally-formed mask body and conforming to and in substantially continuous surface-to-surface contact with the exterior shape of the exterior housing in overlying and protecting relationship, without a substantial gap between the inner surface of the integrally-formed mask body and the exterior shape of the exterior housing, the integrally-formed mask body defining an opening enabling the mask to be placed over the exterior shape in overlying and protecting relationship; and
   at least one retainer having an extension protruding laterally inward from the integrally-formed mask body and toward and into the integrally-formed mask body interior space, wherein the at least one retainer is retained to the exterior housing at an exterior housing edge when the mask is coupled to the mobile communication device, the at least one retainer participating in retaining the integrally-formed mask body to the mobile communication device.

6. The protective mask of claim 5, wherein the mobile communication device includes a socket for battery charging and the integrally-formed mask body defines at least a battery-charging socket opening permitting a power supply to be connected to the socket.

7. The protective mask of claim 5, wherein the mobile communication device includes an earphone-connection socket and the integrally-formed mask body defines at least one earphone-connection socket opening permitting an earphone to be connected to the earphone-connection socket.

8. A mask for attachment to a hand-held mobile phone, the mobile phone having user input and output interfaces, internal components including circuitry and a battery, and an exterior housing completely enclosing the circuitry and battery when the mobile phone is fully assembled and ready for use, the exterior housing including a first face, a second face and opposed side surfaces there between, the mask comprising:
   an integrally-formed mask body molded to conform to a shape of the exterior housing; and
   inner and outer surfaces, the surfaces defining at least one opening in the integrally-formed mask body providing access to at least one of the user input and output interfaces, the integrally-formed mask body being configured such that, when the mask is attached to the mobile phone, the integrally-formed mask body is coextensive with, contours to and overlies the opposed side surfaces, with substantially no space between the mask body and the opposed side surfaces; and at least one retainer having an extension protruding laterally inward from the integrally-formed mask body and toward and into the integrally-formed mask body interior space, wherein the at least one retainer is retained to the exterior housing at an exterior housing edge when the mask is coupled to the mobile communication device, the at least one retainer participating in retaining the integrally-formed mask body to the mobile communication device.

9. A protective mask molded for frictional retention to an exterior housing of a fully assembled mobile communication device having user input and output interfaces, the mobile communication device further having internal components including circuitry and a battery completely enclosed by the exterior housing, and the exterior housing having an exterior shape formed by a back surface and at least portions of opposed side surfaces, the protective mask comprising:

an inner surface closely conforming to the exterior shape of the exterior housing and in substantially continuous surface-to-surface contact with the exterior shape of the exterior housing, with substantially no space between the inner surface of the protective mask and the exterior shape when the protective mask is retained to the exterior housing, the protective mask being molded, integrally formed, contoured and sized to fit tightly against the exterior shape of the exterior housing, thereby providing retention of the protective mask to the exterior housing;

at least one opening defined by the protective mask permitting user access to at least the user input and output interfaces; and at least one retainer having an extension protruding laterally inward from the integrally-formed mask body and toward and into the integrally-formed mask body interior space, wherein the at least one retainer is retained to the exterior housing at an exterior housing edge when the mask is coupled to the mobile communication device, the at least one retainer participating in retaining the integrally-formed mask body to the mobile communication device.

10. The protective mask of claim 9, wherein the protective mask further includes indicia selected from the group consisting of text, graphic elements and combinations thereof.

11. The protective mask of claim 9, wherein the protective mask includes at least one feature opening to permit access to at least one feature of the mobile communication device.

12. The protective mask of claim 9, wherein the protective mask includes a socket opening corresponding to a socket of the mobile communication device, permitting a user to plug a power supply into the socket to charge the mobile communication device.

* * * * *